(12) United States Patent
Zimmer

(10) Patent No.: US 10,597,860 B2
(45) Date of Patent: Mar. 24, 2020

(54) TOILET POSITIONING TEMPLATE AND METHOD

(71) Applicant: Richard Zimmer, Cudahy, WI (US)

(72) Inventor: Richard Zimmer, Cudahy, WI (US)

( * ) Notice: Subject to any disclaimer, the term of this patent is extended or adjusted under 35 U.S.C. 154(b) by 0 days.

(21) Appl. No.: 15/999,261

(22) Filed: Aug. 17, 2018

(65) Prior Publication Data

US 2020/0056359 A1 Feb. 20, 2020

(51) Int. Cl.
*E03D 11/16* (2006.01)
*B23Q 3/18* (2006.01)
*E03C 1/02* (2006.01)

(52) U.S. Cl.
CPC .............. *E03D 11/16* (2013.01); *B23Q 3/186* (2013.01); *E03C 1/02* (2013.01); *E03C 2001/028* (2013.01)

(58) Field of Classification Search
CPC ......... E03D 11/16; E03D 9/005; E03D 9/031; E03D 9/032; E03D 9/033; E03D 9/038; E03D 9/05; E03D 11/00; G01B 3/14; G01B 5/207
USPC .......................................... 33/613, 645, 563
See application file for complete search history.

(56) References Cited

U.S. PATENT DOCUMENTS

| | | | | |
|---|---|---|---|---|
| 4,589,211 A | * | 5/1986 | Policka | B25H 7/04 33/562 |
| 4,971,484 A | * | 11/1990 | Specktor | B62D 65/12 33/638 |
| 5,680,710 A | * | 10/1997 | Carnwath | E03D 11/00 33/613 |
| 6,077,000 A | * | 6/2000 | Gibbons | B23B 47/28 33/529 |
| 6,463,668 B1 | * | 10/2002 | Williams | B25H 7/04 33/528 |
| 6,860,046 B1 | * | 3/2005 | Squitieri | A47F 1/12 33/492 |
| 7,003,889 B1 | * | 2/2006 | Luciani | B27F 5/12 33/194 |
| 7,086,171 B2 | * | 8/2006 | Lawson | G01B 3/14 33/562 |
| 7,153,076 B2 | * | 12/2006 | Parker | B42C 9/0056 412/4 |
| 8,898,823 B2 | | 12/2014 | Mchugh, III | |
| 9,074,377 B2 | | 7/2015 | Wood | |

(Continued)

FOREIGN PATENT DOCUMENTS

CN 201996446 10/2011
DE 10340295 B4 3/2005

OTHER PUBLICATIONS

The Toilet Flange Template is th ultimate tool https://images.homedepot-static.com/catalog/pdfImages/62/620418c9-a285-444a-9ed0-334ddaeb6ede.pdf.

(Continued)

*Primary Examiner* — Yaritza Guadalupe-McCall
(74) *Attorney, Agent, or Firm* — Joseph S. Heino; Erin E. Kaprelian

(57) ABSTRACT

A positioning template comprises a forward portion, a rearward portion, and a medial portion. The rearward portion include a first plurality of indicia, and the medial portion includes a second plurality of indicia. The positioning template further includes a top surface which includes a third plurality of indicia and a plurality of guides. The positioning template includes a bottom surface and a plurality of protrusions extending downwardly from the bottom surface.

6 Claims, 4 Drawing Sheets

(56) References Cited

U.S. PATENT DOCUMENTS

| | | | |
|---|---|---|---|
| 9,140,435 B2* | 9/2015 | Yaphe | F21V 21/00 |
| 9,206,592 B2 | 12/2015 | Coronado | |
| 9,297,157 B2* | 3/2016 | Wendorff | E03D 11/16 |
| 9,506,258 B2 | 11/2016 | Amer et al. | |
| 2012/0079649 A1 | 4/2012 | Edwards | |
| 2012/0240319 A1* | 9/2012 | Yssel | E03D 11/16 |
| | | | 4/252.1 |
| 2015/0152649 A1* | 6/2015 | Amer | E04F 21/0076 |
| | | | 33/527 |

OTHER PUBLICATIONS

Template http://www.americanstandardpro.com/assets/documents/amstd/other/7302071-400.pdf.
How to Rough-in Toilets http://www.ehow.com/how_6749918_rough_in-toilets.html.

* cited by examiner

TOILET POSITIONING TEMPLATE AND METHOD

FIELD OF THE INVENTION

The present invention relates to indoor plumbing and to gravity-operated flush toilets. More particularly, it relates to a template and method for accurately positioning a flush toilet on top of a horizontal surface.

BACKGROUND OF THE INVENTION

A conventional gravity-operated flush toilet has several basic components. The porcelain or china components include a bowl and a water tank mounted on top of a rear portion of the bowl. The bowl and tank are usually separate pieces bolted together to form a so-called two-piece toilet. The bottom of the toilet bowl comprises a horn that is seated on top of a closet collar that is secured to the floor. The closet collar provides an attachment between the toilet and the soil pipe through which waste water passes. To ensure that no waste water passes through the gap between the toilet horn and the closet collar, a wax seal or modular waxless seal, of which there are several types available, is interposed between the toilet horn and the closet collar. Modern gravity-operated flush toilets are frequently made as a so-called one-piece toilet in which the bowl and tank are made as one continuous integral piece of china or porcelain. The present invention, however, is configured for use with two-piece toilets.

The plumbing components of a gravity-operated flush toilet include a fill valve in the tank which is connected to a water supply line, a flush valve surrounding a drain hole in the bottom of the tank that communicates with the bowl, and a flapper valve that normally closes and seals the flush valve. The plumbing components further include a control, such as a pushbutton or lever mounted on a wall of the tank, that moves a lever whose remote end is connected to the flapper valve for lifting the same.

In the experience of this inventor, one of the problems with accurately positioning and placing the two-piece toilet is that the bowl and the base of the bowl may not be positioned properly relative to the bathroom wall behind the toilet. Accordingly, the installer must constantly measure and re-measure the position of the base. What is needed is a way that such positioning can be made only once and without repeated measurement confirmation by the installer.

SUMMARY OF THE INVENTION

In accordance with the present invention, there is provided a toilet positioning template that provides a toilet installer with a relatively inexpensive and fast way to determine that the toilet position, at installation, is made correctly, quickly, and easily using such template. The template could be provided by the original equipment manufacturer (OEM) with the toilet at the time of initial purchase and installation. Alternately, the template cold be provided separately when it becomes necessary to re-set the toilet, for example, when the wax seal under the toilet begins leaking and needs to be replaced. As the template is targeted for use with virtually any type of toilet, the dimensions of the template will vary; however, in all instances, the template will ensure that a proper placement of the toilet is made at installation or re-installation of the toilet bowl and base.

The foregoing and other features of the template and method of the present invention will be apparent from the detailed description that follows.

DETAILED DESCRIPTION

Figure 1:
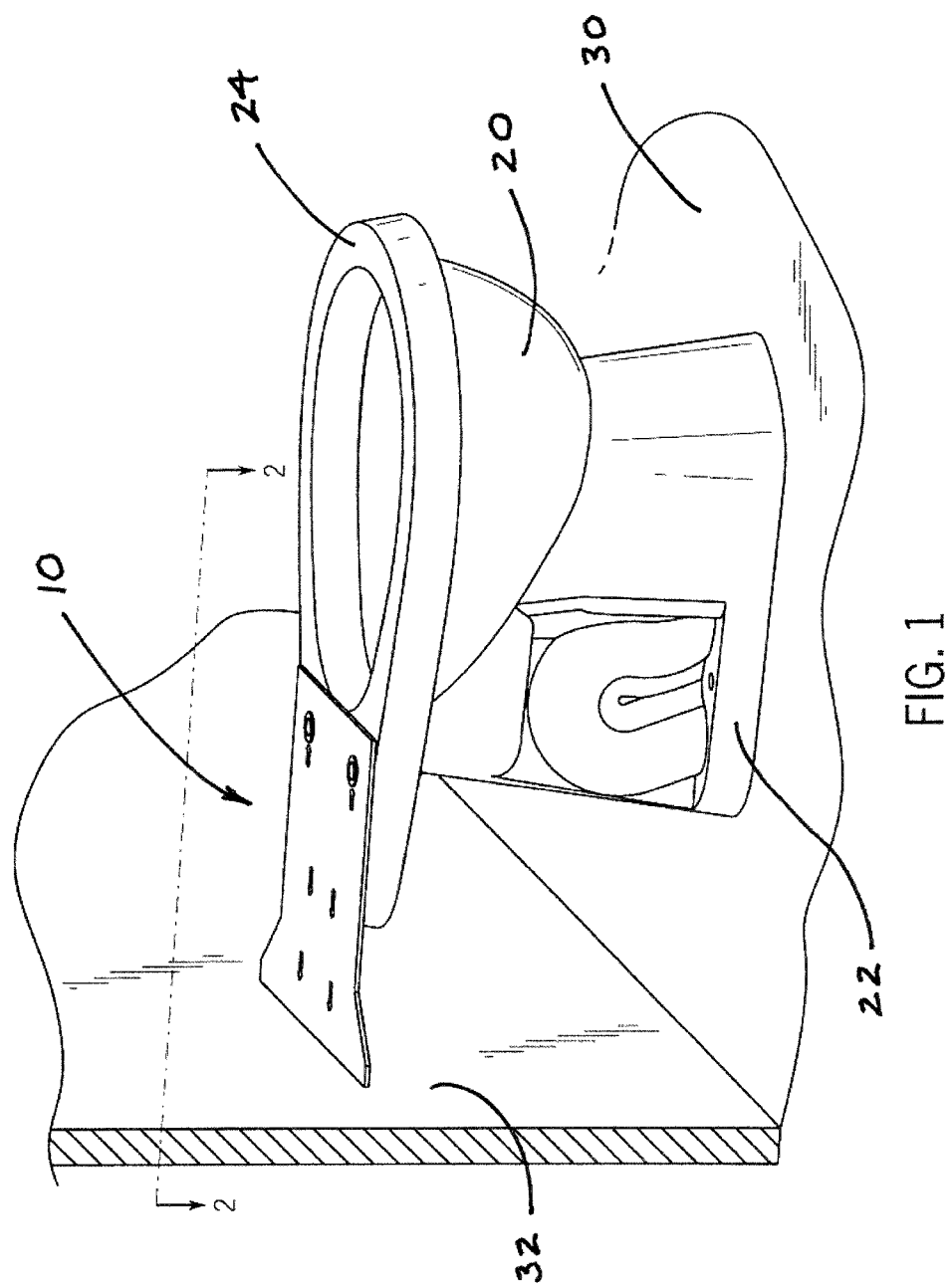
FIG. 1 is a front, side, and top perspective view of a toilet bowl of the type with which the positioning template of the present invention would be used as shown placed adjacent a rear wall.

Referring now to the drawings in detail, wherein like-numbered elements refer to like elements throughout, FIG. 1 illustrates a positioning template, generally identified 10, that is constructed in accordance with the present invention. The template 10 is intended for use with a toilet bowl 20 of conventional manufacture. As shown, the toilet bowl 20 has a base 22 that mounts to a floor 30 by means of a closet collar (not shown) that is mounted to the floor 30 with two fasteners extending upwardly. A horn (also not shown) underneath the base 22 extends into the closet collar to pass waste water from the bowl 20 into a floor drain (not shown). The toilet bowl 20 also has a seating portion 24 on top of which a conventional toilet seat (not shown) can be mounted. This is accomplished via fasteners (not shown) that are inserted through seat mounting holes or apertures 26 that are defined in a tank-support portion 28 that extends rearwardly of the seating portion 24. A second pair of tank mounting holes or apertures 29 are provided for mounting a water tank (not shown) to the tank-support portion 28. See FIG. 3. The toilet bowl 20 is typically positioned in front of a wall 32. A properly mounted toilet bowl 20 extends perpendicularly away from the wall 32. Again, see FIG. 1.

Figure 2:
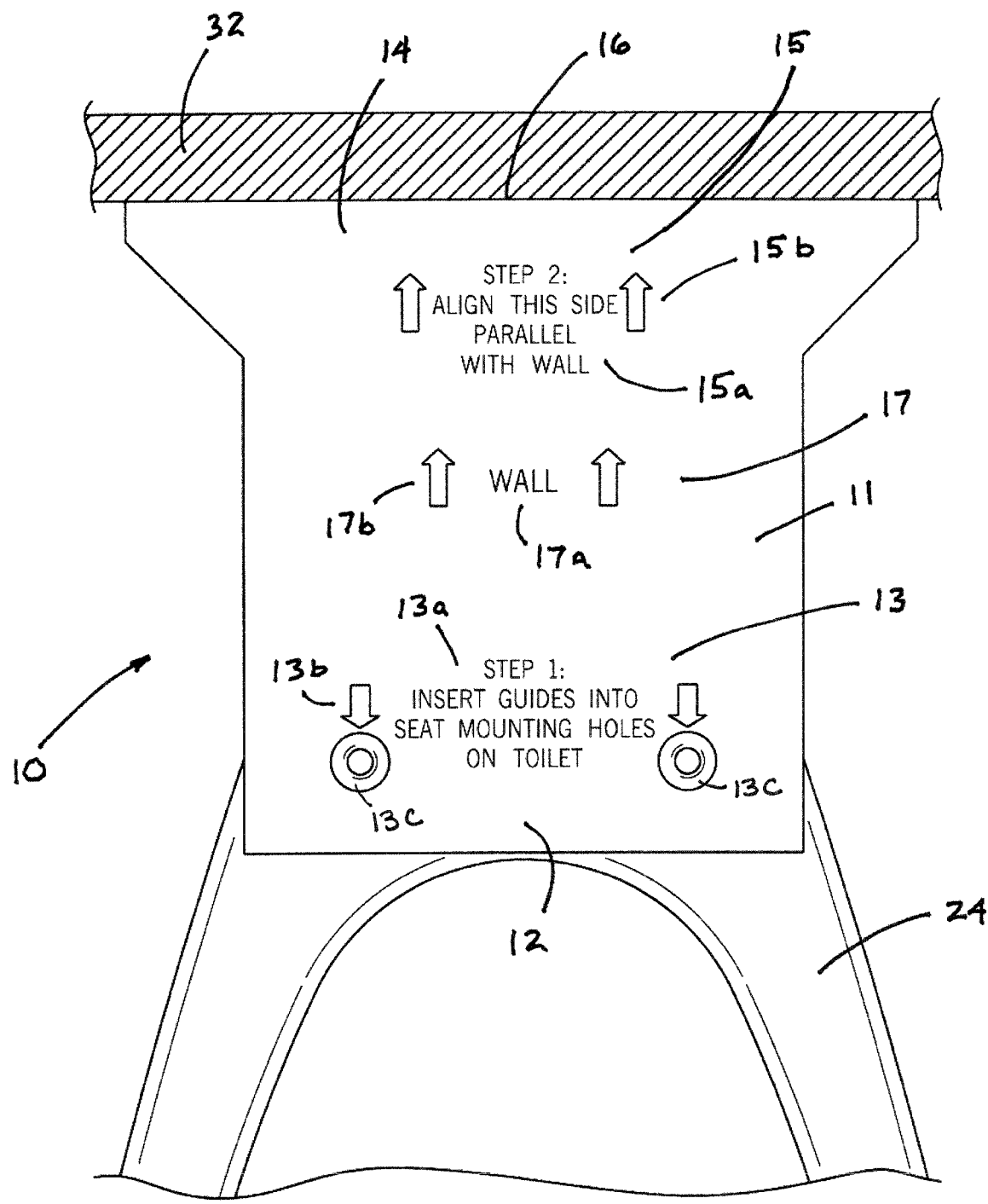
FIG. 2 is an enlarged top plan view of the toilet bowl shown in FIG. 1 together with a top plan view of the positioning template that is constructed in accordance with the present invention as taken along line 2 2 of FIG. 1.

Referring now to FIG. 2, a positioning template 10 as viewed from a point above its top surface 11 is shown. The template 10 further comprises a forward portion 12 and a rearward portion 14. The rearward portion 14 comprises a linear edge 16 which is configured to be positioned adjacent to the wall 32 behind the toilet 20.

The top surface 11 of the template 10 comprises indicia 13, 15 on the forward portion 12 and on the rearward portion 14, respectively. The indicia 13 disposed on the forward portion 12 comprises both words 13a and symbols 13b. In the preferred embodiment, the words 13a read "STEP 1: INSERT GUIDES INTO SEAT MOUNTING HOLES ON TOILET." The symbols 13b include arrows pointing to a pair of opposing guides 13c. Each guide 13c is disposed within a corresponding hole (not shown) defined in the forward portion 12 of the template 10, and corresponds to a location of a pair of protrusions (discussed herein with respect to FIG. 3). The indicia 15 is disposed on the rearward portion 14 similarly comprises both words 15a and symbols 15b. In the preferred embodiment, the words 15a read "STEP 2: ALIGN THIS SIDE PARALLEL WITH WALL." The symbols 15b include arrows pointing to the wall 32. In the medial portion 17 of the template 10, another set of indicia 17 comprising the word "WALL" 17a and additional arrows 17b that likewise point to the wall 32.

Figure 3:
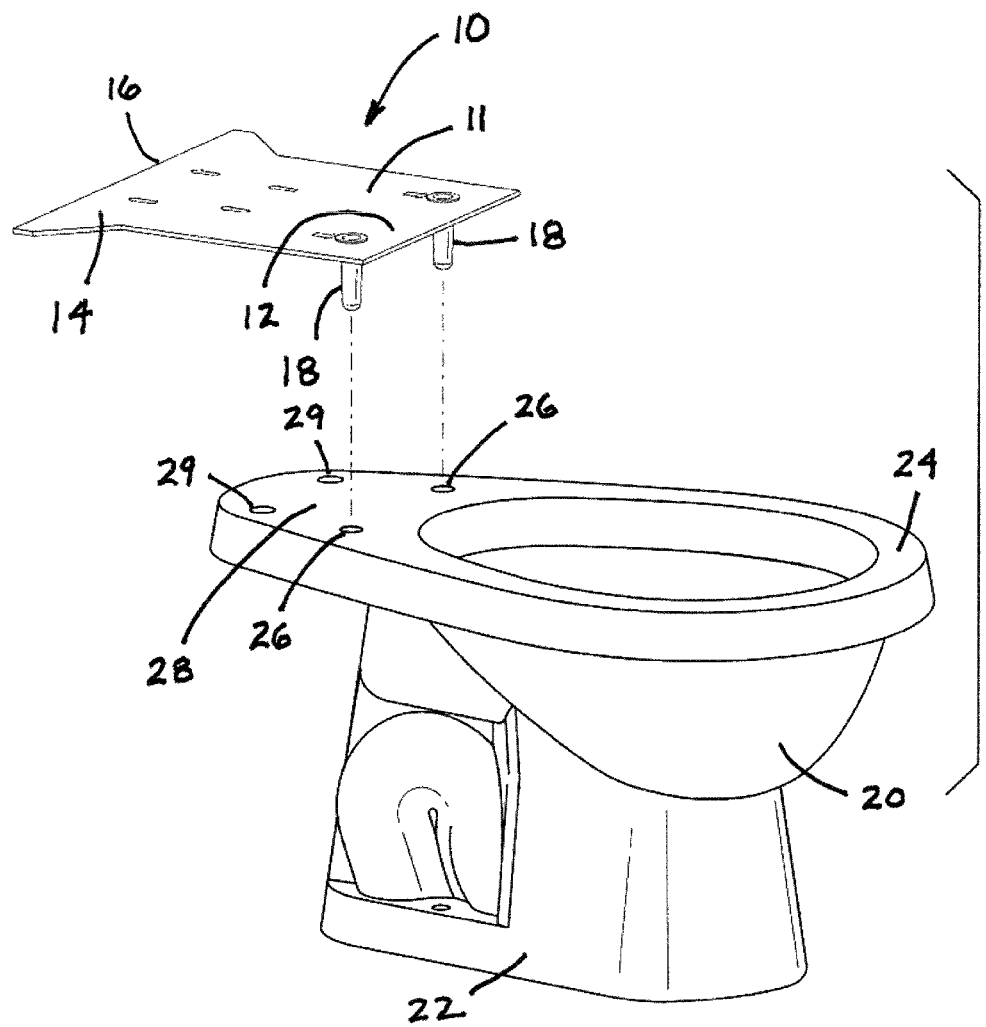
FIG. 3 is a view similar to FIG. 1, but showing the positioning template elevated above the toilet bowl to show the extensions disposed in the template in accordance with the present invention.
Figure 4:
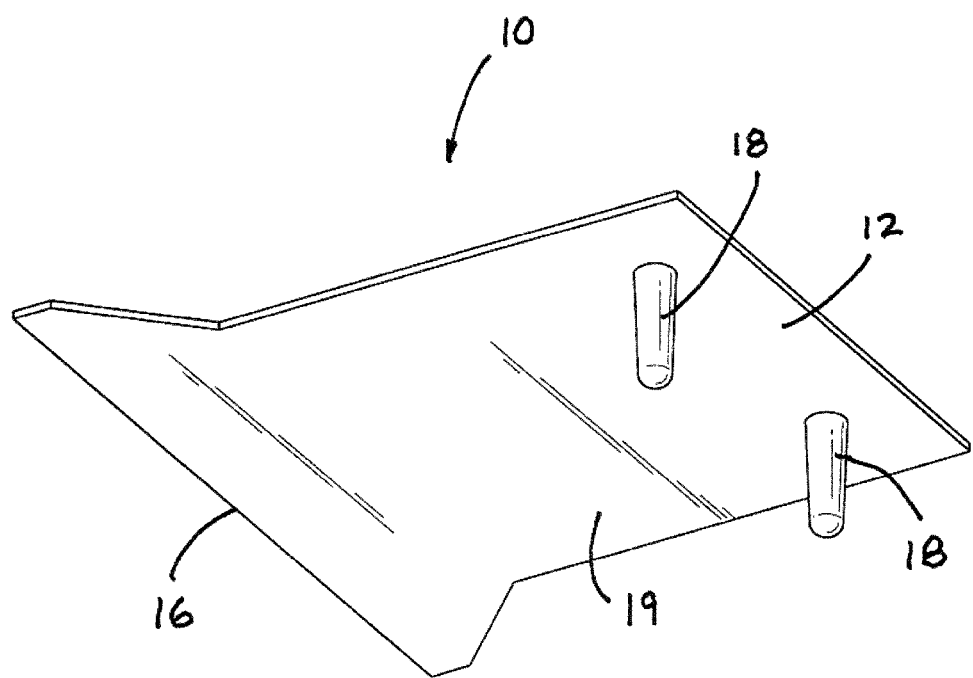
FIG. 4 is a front, side, and bottom perspective view of the positioning template that is constructed in accordance with the present invention.

Referring now to FIG. 3, the toilet bowl 20 and its elements as described above with reference to FIG. 1 is shown. Further, the template 10 is shown elevated above the toilet bowl 20; more particularly, the template 10 is shown elevated above the tank-support portion 28 that extends rearwardly of the seating portion 24. A pair of protrusions 18 protrude downwardly from the forward portion 12 of the template 10. Each protrusion 18 extends downwardly from the bottom surface 19 of the template 10 and is configured to be received within a seat mounting hole or aperture 26 defined in the tank-support portion 28. See FIG. 4. Once the template 10 is seated on top of the tank-support 28, the toilet bowl 20 can be moved rearwardly to the point that the rearward linear edge 16 of the template 10 is placed along the wall surface 32. This ensures that the toilet bowl 20 is properly placed. Once the toilet bowl 20 is placed, the template 10 can be removed and the remaining steps for installing the toilet can be completed.

Although the foregoing has been described with a certain degree of particularity, it is to be understood that the present disclosure has been made by way of example only and that numerous changes in the construction and arrangement of components, some of which have been alluded to, may be used without departing from the spirit and scope of the invention as it is described.

The invention claimed is:

1. A positioning template, comprising:
   a forward portion, wherein the forward portion is configured to be positioned adjacent to a seating portion of a toilet bowl;
   a rearward portion, wherein:
      the rearward portion includes a first plurality of indicia; and
      the rearward portion comprises a linear edge extending away from the toilet bowl and configured to be positioned adjacent to a wall;
   a medial portion, wherein the medial portion includes a second plurality of indicia;
   a top surface, wherein:
      the top surface includes a third plurality of indicia; and
      the top surface includes a pair of guides, wherein the pair of guides correspond to a location of a pair of protrusions;
   a bottom surface, wherein the bottom surface contacts the toilet bowl; and
   a pair of protrusions, wherein:
      the pair of protrusions extend substantially perpendicularly and vertically downwardly from the bottom surface; and
      the pair of protrusions is configured to be received by a pair of seat mounting holes defined in a tank-support portion of the toilet bowl.

2. The positioning template of claim 1, wherein the first plurality of indicia further comprises:
   a first plurality of symbols, wherein the first plurality of symbols are oriented toward the rearward portion of the positioning template; and
   a first plurality of words, wherein the first plurality of words include an explanation for installation.

3. The positioning template of claim 1, wherein the second plurality of indicia further comprises:
   a second plurality of symbols, wherein the second plurality of symbols are oriented toward the rearward portion of the positioning template; and
   a second plurality of words.

4. The positioning template of claim 3, wherein the second plurality of words include words indicating the orientation of the positioning template.

5. The positioning template of claim 1, wherein the third plurality of indicia further comprises:
   a third plurality of symbols, wherein the third plurality of symbols point toward the plurality of guides; and
   a third plurality of words, wherein the third plurality of words includes an explanation for installation.

6. The positioning template of claim 1, wherein the plurality of guides are disposed above the plurality of protrusions such that the plurality of guides indicate the location of the plurality of protrusions.

\* \* \* \* \*